United States Patent
Sommers (10) Patent No.: US 12,021,730 B1
(45) Date of Patent: Jun. 25, 2024

(54) METHODS, SYSTEMS, AND COMPUTER READABLE MEDIA FOR TESTING DATA PROCESSING UNITS IN HIGH AVAILABILITY CONFIGURATIONS

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 18/082,496

(22) Filed: Dec. 15, 2022

(51) Int. Cl.
*H04L 43/50* (2022.01)
*H04L 43/062* (2022.01)
*H04L 43/0817* (2022.01)

(52) U.S. Cl.
CPC ............ *H04L 43/50* (2013.01); *H04L 43/062* (2013.01); *H04L 43/0817* (2013.01)

(58) Field of Classification Search
CPC .... H04L 43/50; H04L 43/062; H04L 43/0817
See application file for complete search history.

(56) References Cited

U.S. PATENT DOCUMENTS

| | | | | |
|---|---|---|---|---|
| 7,640,451 | B2 * | 12/2009 | Meyer | G06F 3/0632 714/4.11 |
| 9,264,301 | B1 | 2/2016 | Chua et al. | |
| 10,055,268 | B2 * | 8/2018 | Veluswamy | G06F 11/2023 |
| 10,255,153 | B2 | 4/2019 | Ganapathy et al. | |
| 2011/0010720 | A1 * | 1/2011 | Smith | G06F 21/57 712/E9.016 |
| 2014/0298335 | A1 * | 10/2014 | Regev | G06F 11/261 718/1 |
| 2016/0098330 | A1 * | 4/2016 | Mu | G06F 3/0619 714/6.23 |
| 2016/0191349 | A1 * | 6/2016 | Buege | H04L 41/5067 709/224 |
| 2016/0210209 | A1 * | 7/2016 | Verkaik | G06F 11/2028 |

OTHER PUBLICATIONS

"SONiC," GitHub, https://github.com/sonic-net/SONiC/blob/master/doc/bfd/BFD_Enhancement_HLD.md, pp. 1-21 (2022).
"High Availability—DPU Functional Diagram," GitHub, https://github.com/Azure/DASH/blob/bda99e8ec6a46543e2b0a9d658d375e86d5f34f1/documentation/high-avail/design/ha-functional-diagram.md, pp. 1-2 (2022).

(Continued)

*Primary Examiner* — Rachel J Hackenberg (57) ABSTRACT

Methods, systems, and computer readable media for a collection of distributed highly available (HA) data processing units (DPUs) in a data center. An example system includes a test packet generator configured for generating test traffic and transmitting the test traffic towards an HA DPU pair. The system includes a test controller configured for executing, while the data center is operating with live traffic, a test case and controlling the test packet generator to cause a failover test event at the HA DPU pair. The system includes a monitoring module, deployed on at least one DPU of the HA DPU pair, and configured for monitoring the HA DPU pair during the failover test event and reporting one or more metrics characterizing the failover test event to the test controller.

12 Claims, 8 Drawing Sheets

(56) References Cited

OTHER PUBLICATIONS

"Overview," GitHub, https://github.com/Azure/DASH/blob/f003713c86a176a5bc8c284e054849dc24f9241b/documentation/high-avail/design/ha-design.md, pp. 1-6 (2022).

"Dash," GitHub, https://github.com/Azure/DASH/blob/1c74c803a3526de6b8ee87b3800c8cf1335657da/Documentation/images/has/hl-arch-rack-design-ha.png, pp. 1-1 (2022).

"High Availability and Scale," GitHub, https://github.com/Azure/DASH/blob/6e4c1ef3efc1c04c7b8971f6391757ec8872de5c/documentation/high-avail/design/high-availability-and-scale.md, pp. 1-12 (2022).

Waithaka, "Configuring High Availability for a Data Center Using Palo Alto Next Generation Firewall," Metropalia University of Applied Sciences, pp. 1-42 (Nov. 5, 2019).

"BGP LLGR: Robust and reactive BGP sessions," APNIC Blog, https://blog.apnic.net/2018/11/06/bgp-llgr-robust-and-reactive-bgp-sessions/, pp. 1-7 (Nov. 6, 2018).

* cited by examiner

METHODS, SYSTEMS, AND COMPUTER READABLE MEDIA FOR TESTING DATA PROCESSING UNITS IN HIGH AVAILABILITY CONFIGURATIONS

TECHNICAL FIELD

The subject matter described herein relates to network testing. More specifically, the subject matter relates to methods, systems, and computer readable media for testing data processing units in high availability configurations.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization.

When testing data center equipment, it is important to make sure that testing mimics real world scenarios and conditions. For example, when testing a data center server or related applications, it may be necessary to mimic or emulate a switching fabric or other resources in the data center and to emulate or approximate various equipment or system related states, e.g., by using various test system configurations or settings, causing events which can change the system state, and/or effecting various impairments.

Accordingly, a need exists for methods, systems, and computer readable media for testing data processing units in high availability configurations.

SUMMARY

Methods, systems, and computer readable media for a collection of distributed highly available (HA) data processing units (DPUs) in a data center. An example system includes a test packet generator configured for generating test traffic and transmitting the test traffic towards an HA DPU pair. The system includes a test controller configured for executing, while the data center is operating with live traffic, a test case and controlling the test packet generator to cause a failover test event at the HA DPU pair. The system includes a monitoring module, deployed on at least one DPU of the HA DPU pair, and configured for monitoring the HA DPU pair during the failover test event and reporting one or more metrics characterizing the failover test event to the test controller.

An example method includes generating test traffic and transmitting the test traffic towards an HA DPU pair; executing, while the data center is operating with live traffic, a test case; causing a failover test event at the HA DPU pair; monitoring, from at least one DPU of the HA DPU pair, the HA DPU pair during the failover test event; and reporting one or more metrics characterizing the failover test event to the test controller.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for testing a system under test (SUT). A test system (e.g., one or more computing platforms, devices, or nodes) can be configured for emulating data flows and evaluating the performance of disaggregated heterogenous compute systems. The test system can include test traffic generation and integrated monitoring capability for executing test scripts and producing and outputting test reports. More specifically, the subject matter relates to methods, systems, and computer readable media for testing data processing units in high availability configurations.

A data processing unit (DPU) is a programmable processor (or processors) that is typically configured for moving data in data centers. A DPU comprises an electronic circuit with, for example, hardware acceleration of data processing for data-centric computing. In some examples, a DPU includes a central processing unit (CPU), a network interface controller (NIC), and programmable data acceleration engines. DPUs can therefore have the programmability of CPUs while being specialized to operate efficiently on tasks such as networking tasks, storage requests, or analytics tasks. Devices such as intelligence processing units (IPUs) and smart NICs can be considered as types of DPUs or as being similar to DPUs. This document uses the term "DPU" to refer to any of these devices.

DPUs can be implemented using application specific integrated circuits (ASICs) or field programmable gate arrays (FPGAs) or system on a chip (SoC) based, or a combination of some or all of these types of circuits. In some examples, DPUs are configured for a large degree of parallel processing. DPUs can be deployed in high availability configurations where, when an active DPU fails or is otherwise shut down or inaccessible, a standby DPU continues processing tasks for the active DPU.

One example of a distributed computing architecture for data centers is the Disaggregated APIs for SONiC Hosts (DASH) high-availability configuration. The test systems described in this document can be configured for reporting one or more metrics characterizing a failover event between two data processing units (DPUs) in a DASH configuration. The test system can test within an emulated fabric using a fabric emulation device. The fabric emulation device can include physical application-specific integrated circuit (ASIC) switching resources and a switching environment emulator configured for emulating, using the physical ASIC switching resources, a data center switching fabric.

Figure 1:
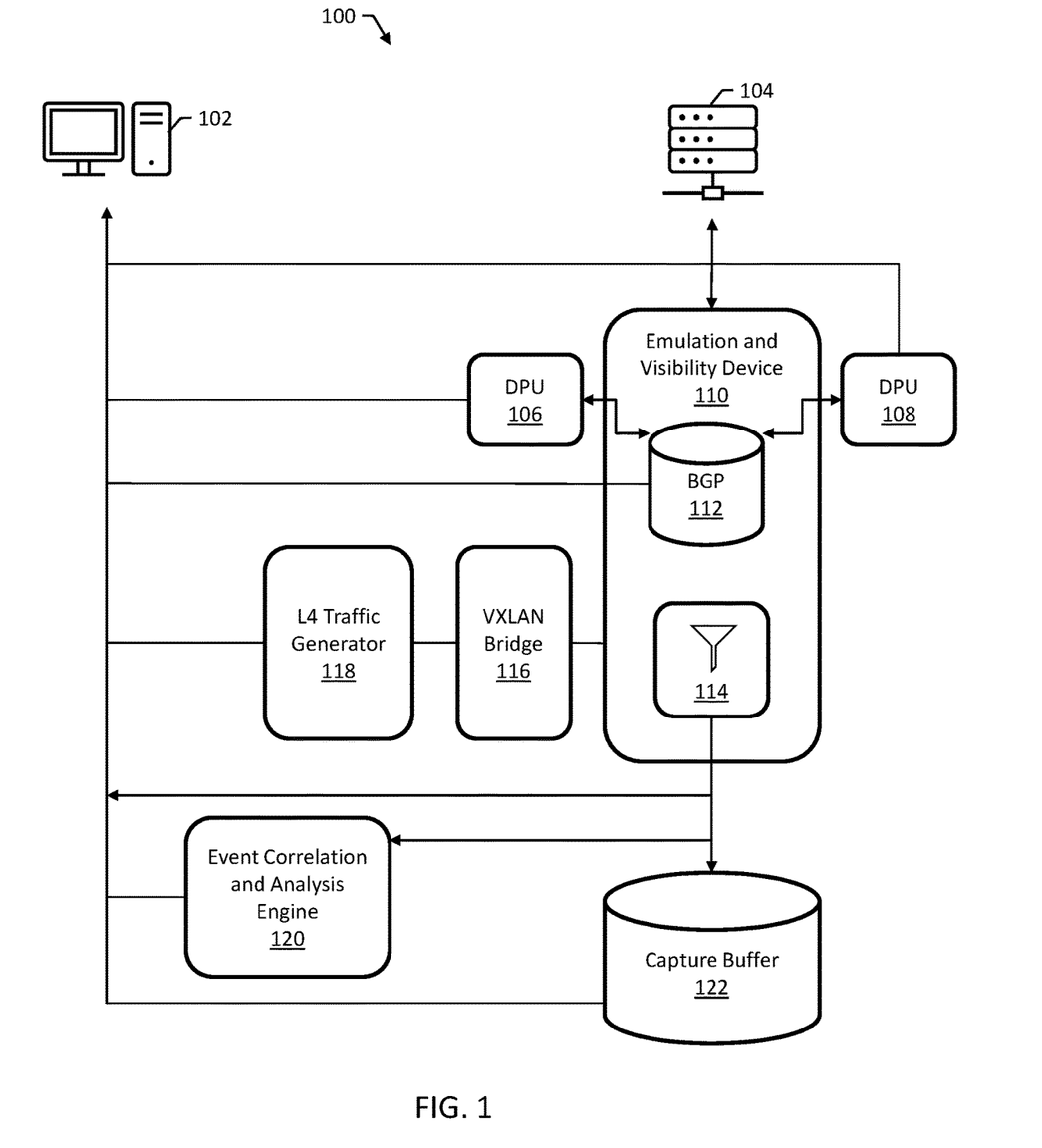
FIG. 1 is a block diagram of an example network test environment.

FIG. 1 is a block diagram of an example network test environment 100. The network test environment 100 includes a test controller 102 configured for testing a DASH flow synchronization system 104 and at least two DPUs 108 and 110. FIG. 1 shows the portions of the network test environment 100 used for testing DPU synchronization behavior, which in some cases may be only a small portion of a larger data center topology.

The test controller 102 includes one or more processors and memory storing instructions for executing at least one test case to test a collection of distributed highly available (HA) data processing units (DPUs) in a data center and reporting one or more metrics characterizing a failover event. Outputting a test report can include, e.g., storing one or more reports in a database, providing results to a different computer system though an application programming interface (API), or any other appropriate processing of the test report.

In some example DASH systems, DPUs are grouped into computing appliances with, e.g., six DPUs located in a chassis. Two of these computing appliances can be coupled to two top of rack (ToR) switches. Each DPU has an HA peering partner in the other computing appliance. This architecture handles failures of, for example, single DPU cards, DPU-ToR links, an entire chassis full of DPUs, or of one ToR switch.

DPUs are configured to maintain flow state synchronization with their peering partners. The test controller 102 can test the DPUs regardless of the specific flow state synchronization algorithm used by the DPUs. Typically, the flow state synchronization is performed by exchanging internet protocol (IP) network packets from DPU to DPU, through the data center network.

The network test environment 100 also includes an emulation and visibility device 110, a VXLAN bridge 116, a L4 traffic generator 118 (or other appropriate traffic generator), and an event correlation and analysis engine 120. In some examples, the network test environment 100 includes a capture buffer 122.

In operation, the test controller 102 runs test scripts, configures devices, collects data, and produces and outputs reports. The test controller 102 may also execute iterative/closed loop algorithms to determine performance boundaries or enable performance tuning to achieve an optimum target performance benchmark. The test controller 102 can interface with some or all of the other test elements within the network test environment 100. For example, the test controller 102 can be configured to perform one or more of the following functions:

Configure the DPUs 106 and 108, for example, by setting up network routing tables, mappings, monitor status, read counters, and the like. For instance, in some cases, the test controller 102 can act as the DASH software defined network (SDN) controller which would normally control a data center.

Install and/or enable Berkeley packet filter (BPF) probes inside the network operating system (NOS) of the DPUS 106 and 108 and receive corresponding events.

Configure the ToR devices (real or emulated), for example, by setting up routing tables, configuring border gateway protocol (BGP), monitor status/counters, and the like.

Configure the L4 traffic generator 118 and retrieve results, and in some cases, retrieve packet captures Configure a sniffer in a packet broker or in the emulation and visibility device 110

Read real-time (or near real-time) results from the event correlation and analysis engine 120, for example, measurement/analysis values distilled from the real-time event or packet stream from the sniffer Read packets from the optional capture buffer 122 to perform post-analysis, e.g., at a lower speed by a CPU The two DPUs 106 and 108 represent just one possible HA pair for purposes of illustration. The network testing environment 100 can be used for testing various numbers of HA pairs. In some cases, the test controller 102 is configured to test any number of such pairs. For example, some system-level tests may use a full-scale buildout of two computing appliances, each containing, e.g., six DPUs.

The emulation and visibility device 106 can include physical ASIC switching resources and a switching environment emulator configured for emulating, using the physical ASIC switching resources, a data center switching fabric. The emulation and visibility device 110 is configured to emulate portions of a data center in operation and to provide visibility as to messaging within the emulated portions of the data center. By performing these functions, the emulation and visibility device 110 can emulate ToR switches wired in an HA arrangement. In the 110-test environment 100 of FIG. 1, the emulation and visibility device 106 can emulate ToR switches, or physical switches can be used, or some combination of both emulated and physical switches can be used. In some examples, the emulation and visibility device 106 can be implemented on a network packet broker.

The emulation and visibility device 110 includes a BGP daemon 112 and a filter 114. The BGP router 112 can include, e.g., a BPF probe on BGP or NOS events (e.g., BFD link fault detection, route withdrawal). Although BGP daemon 112 is shown as a component of the emulation and visibility device 106 in FIG. 1, in some examples, BGP potentially runs in an external server. The filter 114 can be configured for sniffing, filtering, truncating, adding timestamps, mirroring traffic, and cross-connecting.

In a DASH failover operation, the BGP daemon 112 handles the resulting rerouting from the active DPU to the standby DPU. For example, if a link to a DPU fails, a Bidirectional Forwarding Detection (BFD) daemon can inform the BGP daemon 112 to withdraw the routes transiting the failed link. Similarly, if a DPU fails, all routes to the DPU will be withdrawn.

The emulation and visibility device 110 can be implemented as a single, integrated complex device or as several devices appropriately coupled together. In operation, the emulation and visibility device 110 can provide one or more of the following functions:

Layer 3 switch/router—takes L4 traffic supplied by the L4 traffic generator/tester 118 and emulates a ToR L3 switch/router, sending "Datacenter (DC) traffic" to the DPUs 106 and 108 and back to the tester 118; it also includes functions such as link fault detection, BGP daemon, etc. Since BGP may be used to enable the DASH HA switchover mechanism, the network test environment 100 can have the BGP daemon 112 in an emulated switch or a physical switch. This daemon 112 can be implemented in a dedicated physical device which provides the emulated switches run in another server (for CPU performance reasons) or exist in a physical ToR switch in those test scenarios that use physical switches.

BPF probes (or other appropriate probes) to monitor internal behavior of the BGP daemon 112, related BFD daemons (for link fault detection), other parts of the NOS stack. These probes enable measuring precise timing of events such as time to detect link failure, signal the BGP daemon 112, change the route in SONiC Redis database, program the switching ASIC via its SDK, etc. The ability to perform these functions may depend on the level of access to the NOS stack:
- If the emulation and visibility device 110 emulates the ToR switch, then the device 110 has full access to the NOS stack (and the device 110 can be configured to implement or mimic the NOS for these functions).
- If it is the SONiC stack on a physical ToR switch, then the network test environment 100 can instrument the physical ToR switch.

Packet sniffer/filter/mirror 114—monitors packets going to/from the L4 tester 118 and DPUs 106 and 108 (and physical ToR switches if used) and mirrors selected content to the capture buffer 122 and event correlation and analysis engine 120, including optional truncation of payloads to conserve capture bandwidth and storage space. Timestamps and other In-band Network Telemetry (INT)-type data may be added as headers or trailers.

Sniffed and mirrored packets can comprise copies and/or truncated and INT-supplemented versions of:
- L4 traffic sent to and received from DPUs 106 and 108 and possibly the ToR switches (emulated or physical). In some examples, the system is configured to trace traffic through the ToRs, e.g., latency, ECMP, load-balancing effects.
- Inter-DPU HA sync messages (on both data and control channels)
- HA telemetry data from DPUs, if available (e.g., enabled for testing only as it may load CPUs and traffic).

Sniffed and mirrored packets can go to one or more of: the capture buffer 122, the test controller 102, or the event correlation and analysis engine 120.

The L4 traffic generator 118 generates and receives TCP traffic to provide stateful flows to the DPUs 106 and 108. For DASH, these will be VXLAN encapsulated.

The VXLAN bridge 116 is an optional element that can be configured to encapsulate L4 test traffic into VXLAN tunnels, if the L4 traffic generator 118 does not support VXLAN natively. In some examples, the L4 traffic generator 118 is configured to generate VLAN-tagged L4 packets and the VXLAN bridge 116 is configured to strip VLAN from layer 1.5 and encapsulate the packets in VXLAN tunnels expected by the DPUs 106 and 108. In some examples, the VXLAN bridge 116 is integrated into the emulation and visibility device 110.

The event correlation and analysis engine 120 is configured to receive mirrored packets from the sniffer 114 and perform real-time (or near real-time) correlation, analysis and data accumulation which can be continuously read in during tests or at test completion for summary results. These results can supplement the type of measurement data available from conventional L4 testers. For example, the event correlation and analysis engine 120 can be used to measure the rate at which a standby DPU's "passive flow entries" lag behind the active DPU's flow entries in real-time, and be used dynamically to find, e.g., an upper limit on flow table tracking, the failure thresholds thereof, "sweet spots" for performance tuning, and the like.

The capture buffer 122 can be used in lieu of or in addition to the event correlation and analysis engine 120. The capture buffer 122 can be used to store select mirrored packets that can be read and analyzed by the test controller 102, stored for replay, and the like.

The network test environment 100 can be used for performance testing, conformance testing, and robustness/stability testing of DASH HA systems. For example, performance testing can include measuring and determining one or more of the following:
- How quickly does it take a standby peer to acquire from the active peer, and be able to demonstrate (with observable traffic flows), a certain-sized set of new flows?
- How quickly can the standby peer device track flows being added/subtracted from the active device with no accumulation of backlog?
- Can flow updates be buffered even if the standby cannot process them as fast as they arrive?
- Is there a flow add/remove rate which causes flow updates to be temporarily, or irretrievably lost (e.g., due to buffer overflow)?
- What are various lag times when a new flow arrives at the active device, until:
  - The new flow entry is entered into in the active device's table
  - The active device supports the new flow (forwarding the traffic)
  - New flow sync update messages are sent to the standby peer
  - The peer stores the new flow update in its tables
  - The peer can carry the traffic in the new flow for hot-standby switchover
- Do the reported telemetry results, if available, agree with expectations based on the stimulus the system provides?

Conformance testing can include determining and measuring one or more of the following:
- Does each HA sync message get properly processed, without regard to performance concerns (state-machine and algorithm correctness)
- Do flows get aged properly and removed from the tables after a timeout (or several timeouts)?
- Can DPUs from different vendors interoperate?

Robustness and stability testing can include determining and measuring one or more of the following:
- Do flows get aged properly and removed from the tables after a timeout (or several timeouts)?
- How does the sync algorithm operate depending upon low-to-moderate datacenter path impairments (packet loss due to congestion, L1 CRC errors, etc.) as well as link flapping or outright failure?
- How sensitive is the sync algorithm to inter-DPU path SLO (service level objectives), i.e., bandwidth limiting via QoS or similar policies?
- How robust are the HA controllers when subjected to:
  - Too-high new flow establishment (more new connections per second than the DPU can support)?
  - Excessively high inter-DPU message rates
  - Corrupt or invalid update messages
  - Unexpected states, e.g., flow updates which don't conform to an expected update state Discover instabilities or pathological conditions
    Can test conditions be applied which cause HW or SW lockups; instabilities; oscillation?
    Are these conditions self-healing?

Figure 2A:
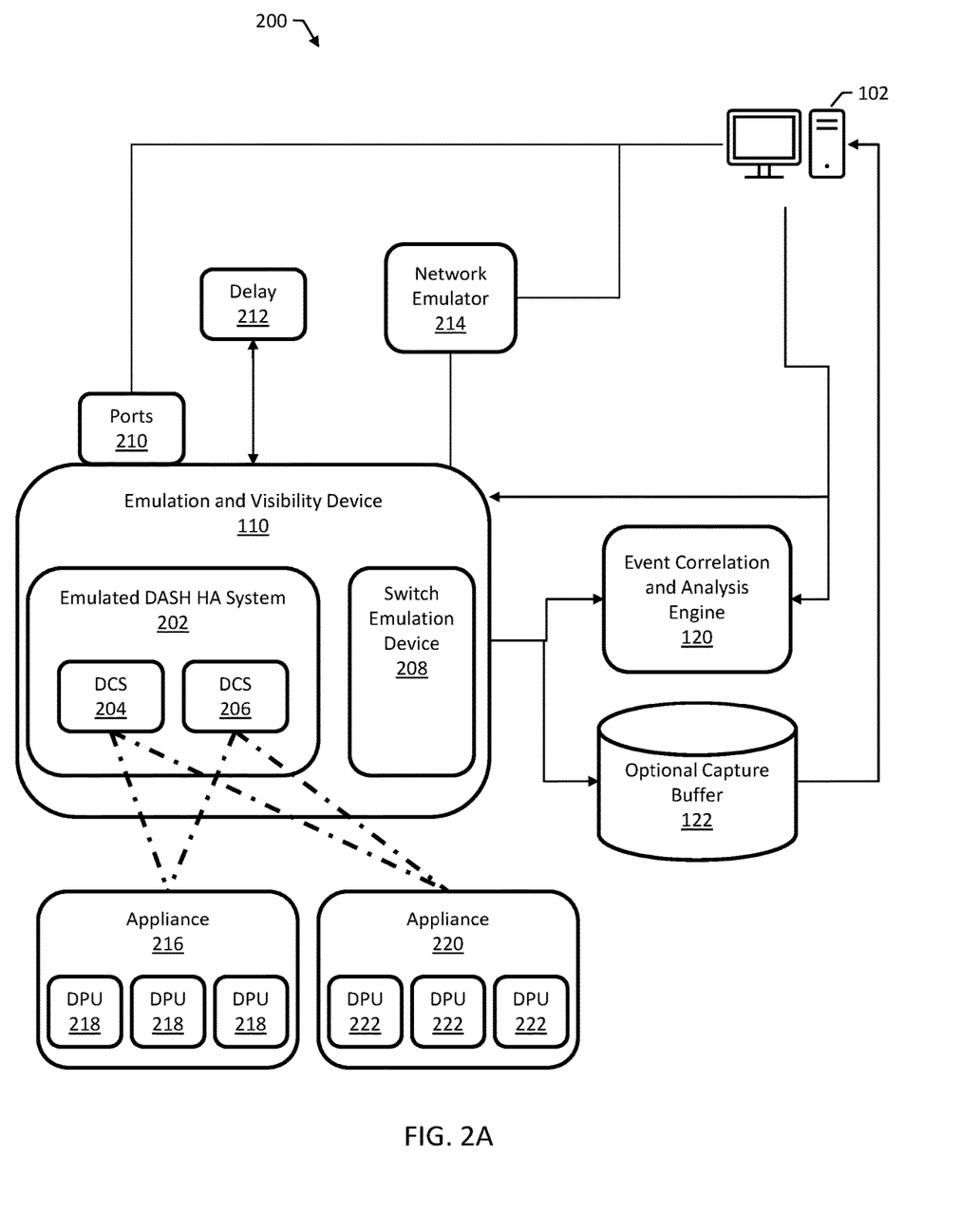
FIGS. 2A-2C illustrate HA testing in the context of a system comprising redundant DPUs, data center switches, and links.
Figure 2B:
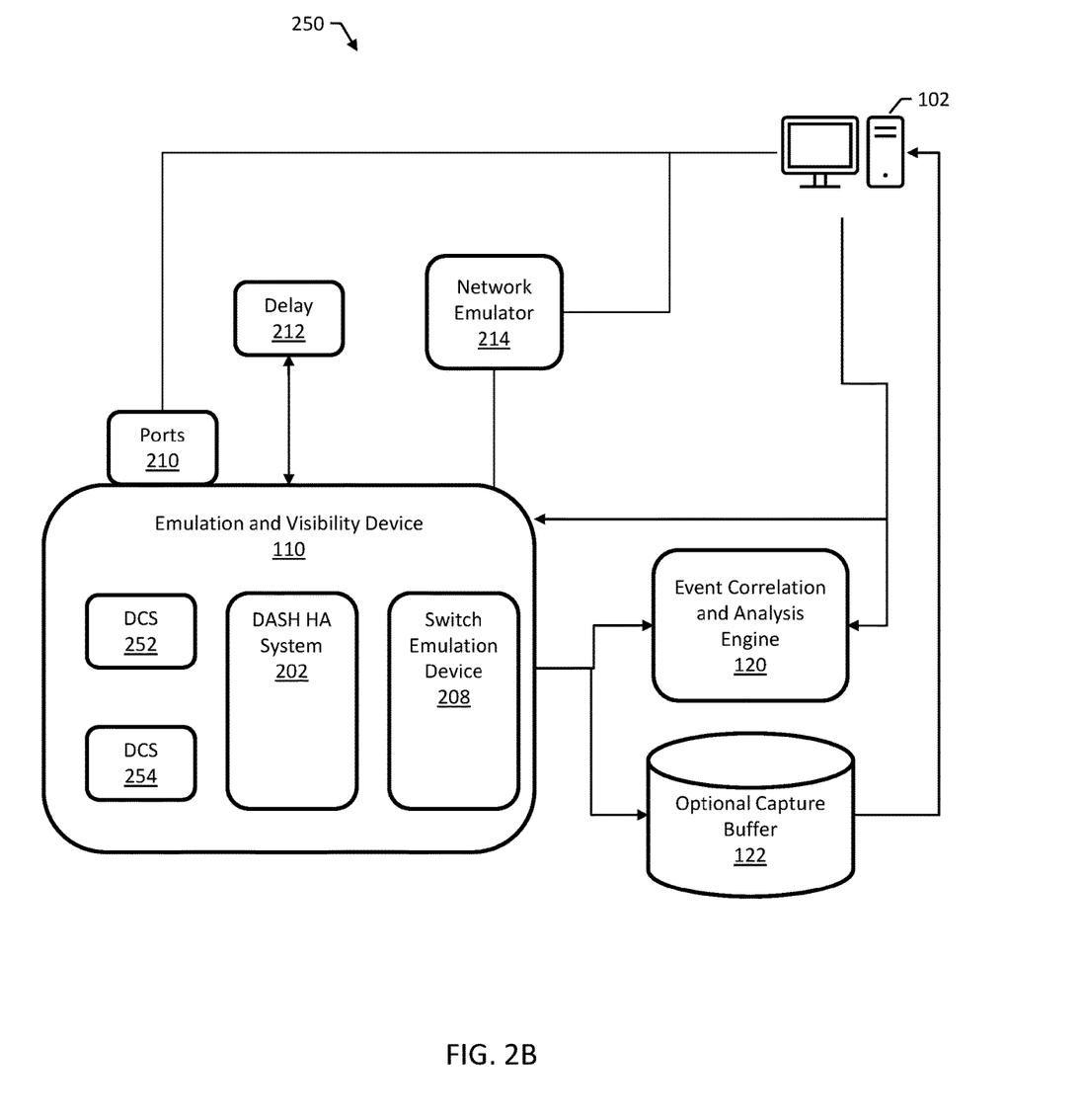
Figure 2C:
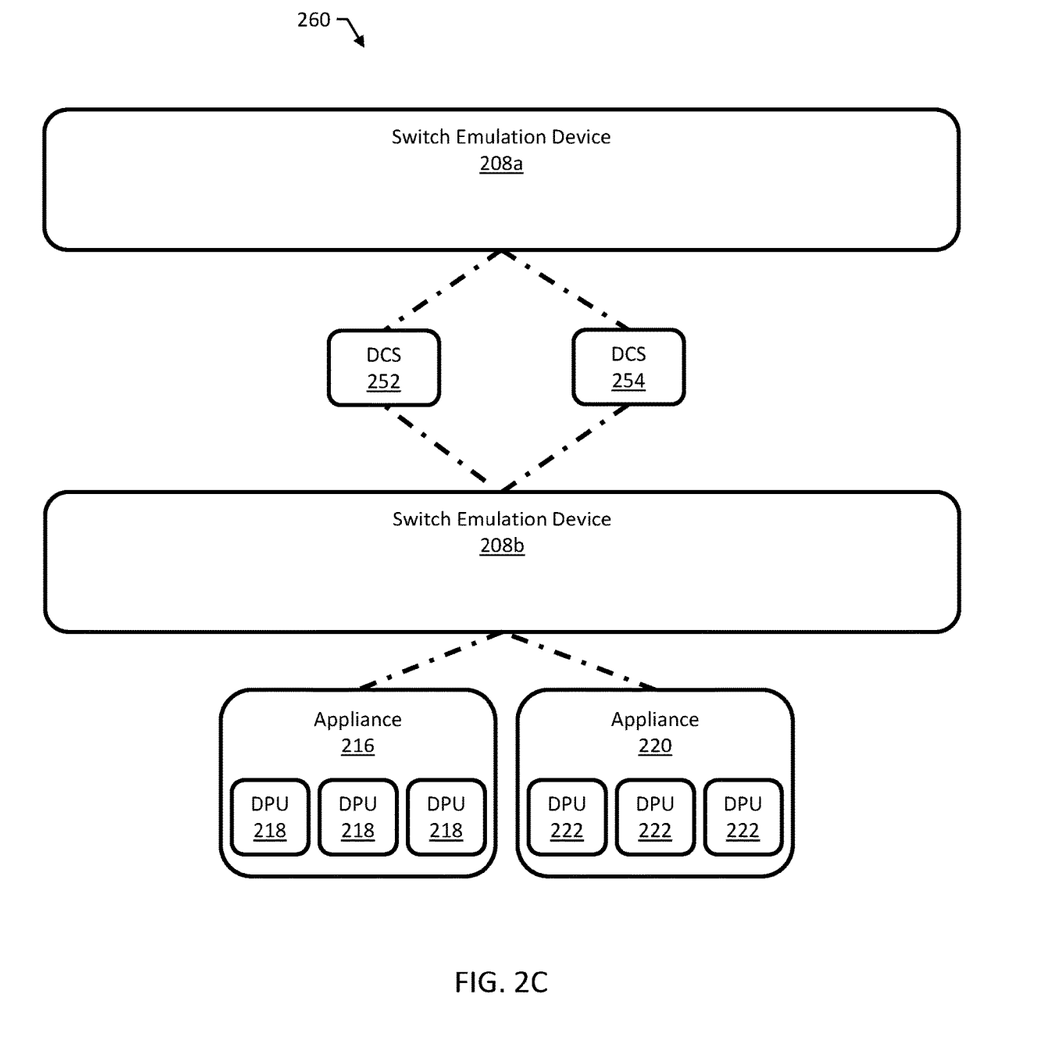

FIGS. 2A-2C illustrate HA testing in the context of a system comprising redundant DPUs, data center switches, and links.

FIG. 2A is a block diagram of a test system 200 using an emulated DASH HA system 202 including emulated data center switches 204 and 206 (for example, ToR switches, leaf switches, spine switches, or other appropriate switches). In this scenario, the system 200 emulates the data center switches 204 and 206 using a device 208 with ASIC switching resources. The system 200 includes two example computing appliances 216 and 220 each having DPUs 218 and 222.

The emulated data center switches 204 and 206 route and load-balance packets with given virtual IPs across DPUs 218 and 222. The emulated data center switches 204 and 206 are configured to supply the functions of the BGP daemons of each emulated switch. The BGP daemons for the emulated data center switches 204 and 206 could be implemented, e.g., in the test controller 102 or other external server.

FIG. 2B is a block diagram of a test system 250 using physical data center switches 252 and 254 in order to test the behavior of hardware and software which will comprise an operational data center. This potentially gives more realistic test result for the failover events than switch emulation and even allows for more conservative regression-test results prior to deploying new DASH software/hardware into a data center or canary data center.

FIG. 2C shows an example of a portion of the system 260 that can be configured to emulate the upper tiers of the datacenter, for example: links and switches; perform patch-panel and impairment functions for all the ToR-to-DPU links; and perform sniffer/mirror functions. Any additional devices could have connections to the test controller 102, capture buffer 122, event correlation and analysis engine 120, and other components as appropriate.

As shown in FIG. 2C, a first component 208a of the switch emulation device 208 is configured to emulate an upper portion of the data center including links and switches. A second component 208b of the switch emulation device 208 is configured to emulate a lower portion of the data center including links between the physical data center switches 252 and 254 and the appliances 216 and 220 (and ultimately to the DPUs 218 and 222). Each of the components 208a and 208b can be implemented on a single device, or portioned among a plurality of devices, which can be useful for scaling.

Figure 3:
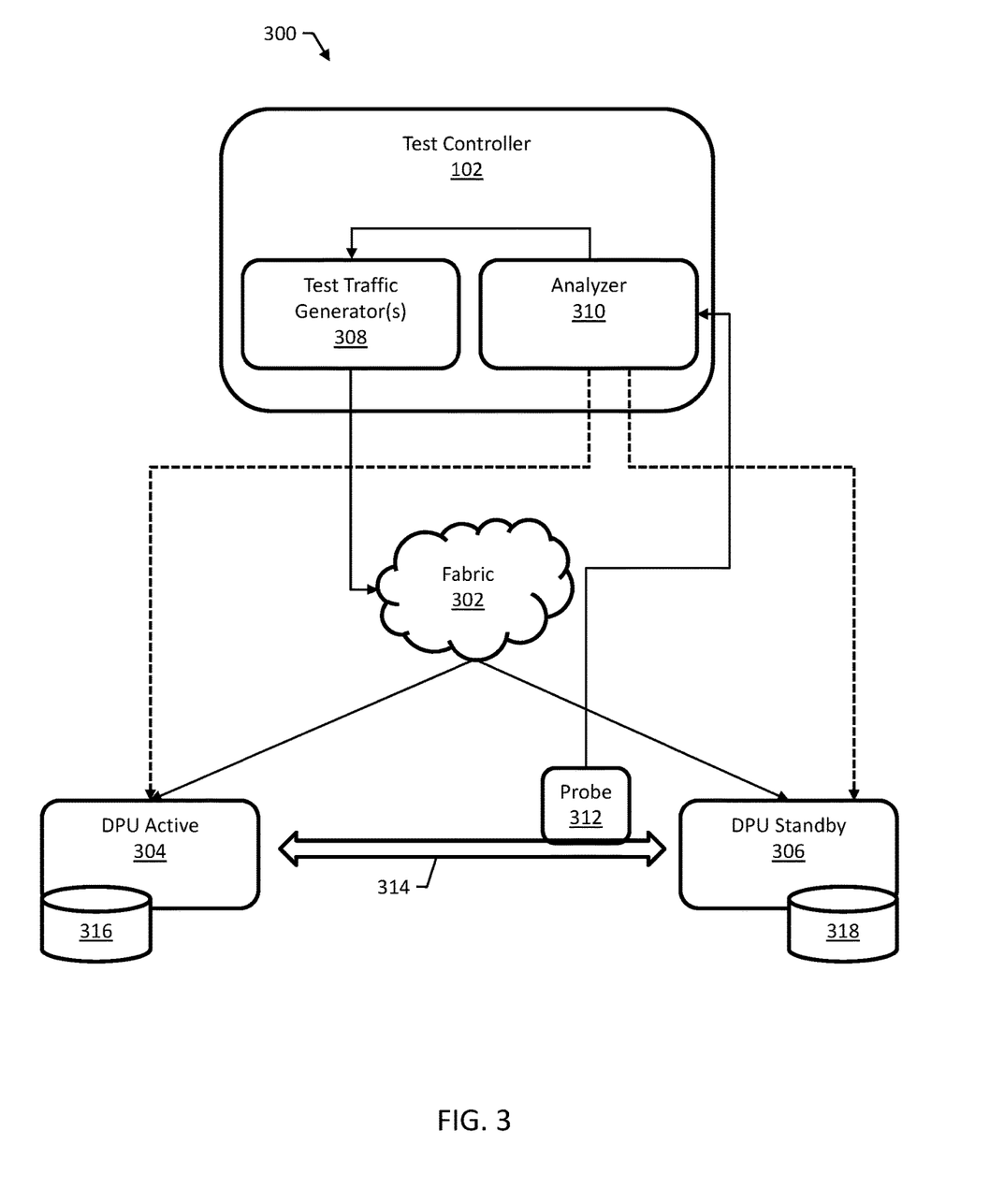
FIG. 3 is a block diagram illustrating a system for HA DPU performance tuning.

FIG. 3 is a block diagram illustrating a system 300 for HA DPU performance tuning. FIG. 3 shows a test controller 102, e.g., the test controller 102 of FIG. 1, a data center fabric 302, an active DPU 304, and a standby DPU 306. The test controller 102 includes at least one test traffic generator 308 and a DPU HA performance analyzer 310 coupled to a probe 312 configured to monitor HA status synchronization messages 314 exchanged by the DPUs 304 and 306. Each of the DPUs 304 and 306 has a respective status information repository 316 and 318.

In operation, execution of a test case is initiated by the test controller 102 using a set of initial HA DPU parameter values and an initial set of test traffic generation attributes (e.g., throughput, traffic mix, and the like). Test packets traverse the fabric 302 (which can be physical or emulated or a hybrid of physical and emulated components), where the test packets are routed and sent to one of DPUs 304 and 306 depending upon datacenter configuration (e.g., load-balancing flows among a pair of active-active DPUs).

The DPUs 304 and 306 receive and process the test packets and update their status data structures 316 and 318. The DPUs 304 and 306 exchange status update information via messaging 314 that is sent through the fabric 302.

The monitoring probe 312 observes the status update messaging 314 and captures at least a portion of the status information for the analyzer 310. The analyzer 310 analyzes the captured status information and uses the results to adjust/tune operational parameter setting values for the DPUs 304 and 306. In some examples, the analyzer 310 generates benchmarking/performance scores for the DPUs 304 and 306, e.g., for comparison of DPUs from different vendors.

Then, test traffic attributes for the next test iteration are passed to the test traffic generators 308 and a new test iteration is initiated using the new test traffic attributes. The testing and tuning can be repeated until an end condition is reached, e.g., a number of iterations is completed, or a threshold performance score is reached.

Figure 4:
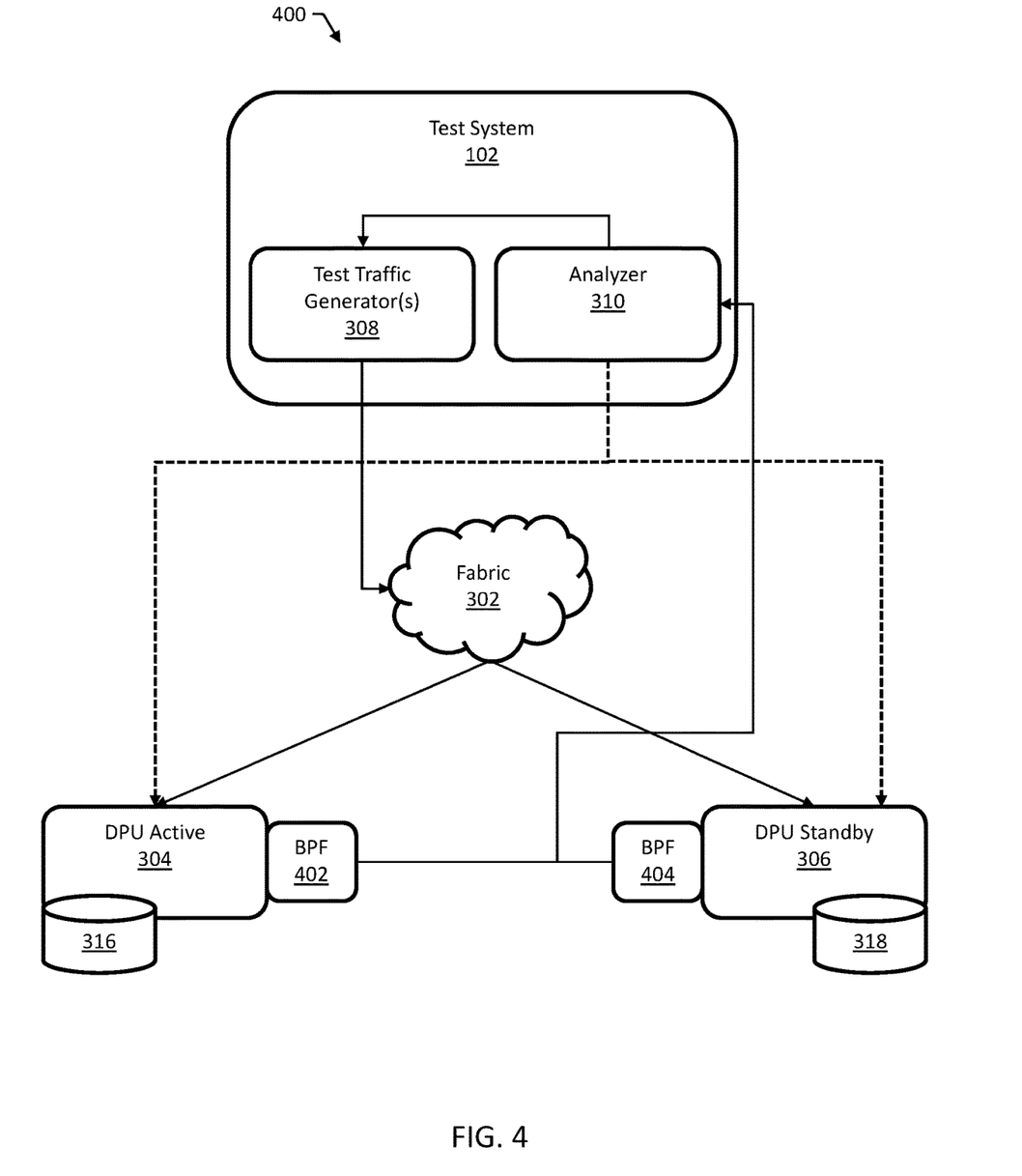
FIG. 4 is a block diagram illustrating a system for HA DPU performance testing.

FIG. 4 is a block diagram illustrating a system 400 for HA DPU performance testing. FIG. 4 shows a test controller 102, e.g., the test controller 102 of FIG. 1, a data center fabric 302, an active DPU 304, and a standby DPU 306. The test controller 102 includes at least one test traffic generator 308 and a DPU HA performance analyzer 310. Each of the DPUs 304 and 306 has a respective status information repository 316 and 318.

In operation, execution of a test case is initiated by the test controller 102 using a set of initial HA DPU parameter values and an initial set of test traffic generation attributes (e.g., throughput, traffic mix, and the like). Test packets traverse the fabric 302 (which can be physical or emulated or a hybrid of physical and emulated components), where the test packets are replicated and sent to both DPUs 304 and 306.

The DPUs 304 and 306 receive and process the test packets and update their status data structures 316 and 318. Monitoring agents 402 and 404 (e.g., eBPF, uProbes, Kprobes, streaming telemetry servers, or any appropriate monitoring system) associated with the DPUs 304 and 306 capture at least a portion of the status information and report the captured status information to the analyzer 310. The monitoring agents 402 and 404 may be used instead of or in addition to the probe 312 shown in FIG. 3.

The analyzer 310 analyzes the captured status information and uses the results to adjust/tune operational parameter setting values for the DPUs 304 and 306. In some examples, the analyzer 310 generates benchmarking/performance scores for the DPUs 304 and 306, e.g., for comparison of DPUs from different vendors.

Then, test traffic attributes for the next test iteration are passed to the test traffic generators 308 and a new test iteration is initiated using the new test traffic attributes. The testing and tuning can be repeated until an end condition is reached, e.g., a number of iterations is completed or a threshold performance score is reached.

The test systems described above can be configured to provide some or all of the following test functions:
    Measure standby flow update rate—Add flows to active DPU by sending L4 traffic. Send same flows to standby DPU. Also send same traffic to standby (e.g., via replication in a switching device) and count packets forwarded through the fast path to see when the system adds the flow (without terminating that flow). Also, monitor HA synchronization messages between the two, and possibly BPF probes/telemetry, to determine the timelines of the components of the synchronization mechanism used.

Determine performance limit of HA updates—Using similar algorithm as above, increase the rate of new flows until the standby fails to update within acceptable parameters (update fast enough, fail to update at all, etc.). Use search techniques to determine the limits of the tested parameters. Vary HA tuning parameters (e.g., timers, buffer sizes, etc.) to characterize various parameters.

Interoperability testing—Measure pairs of identical DPUs. Then mix in different combinations of DPUs (different vendors, software releases, SKUs). Create reports to show interoperability scores and the like.

HA Sync channel Conformance testing—Send traffic to create new flows, observe HA sync messages between DPUs and confirm correct behavior.

Stale Flow timeout behavior. Create new flows, stop traffic and measure time to remove a flow from the flow tables (active and standby). In some examples, the system may use advanced high-speed, fine-grained telemetry from the DPU. In some examples, the system determines the timeout behavior from total #active flows counters which could be read at CPU speeds.

Unreliable HA data channel impact—Create deliberate packet loss in the nominally unreliable (UDP) data sync channel. Measure impact upon flow sync reliability and interaction of stale flow timers. Change loss percentage or distribution (even, bursty, etc.) and measure stability and robustness.

FIGS. 1-4 illustrate systems and methods for testing HA DPUs in a test environment. Similar systems and methods can be used for testing HA DPUs in a live data center environment to determine HA readiness and switchover performance. For example, a test system can use synthetic traffic injected into a live, operating data center to characterize DPU synchronization and switchover performance in response to a failover event.

Figure 5A:
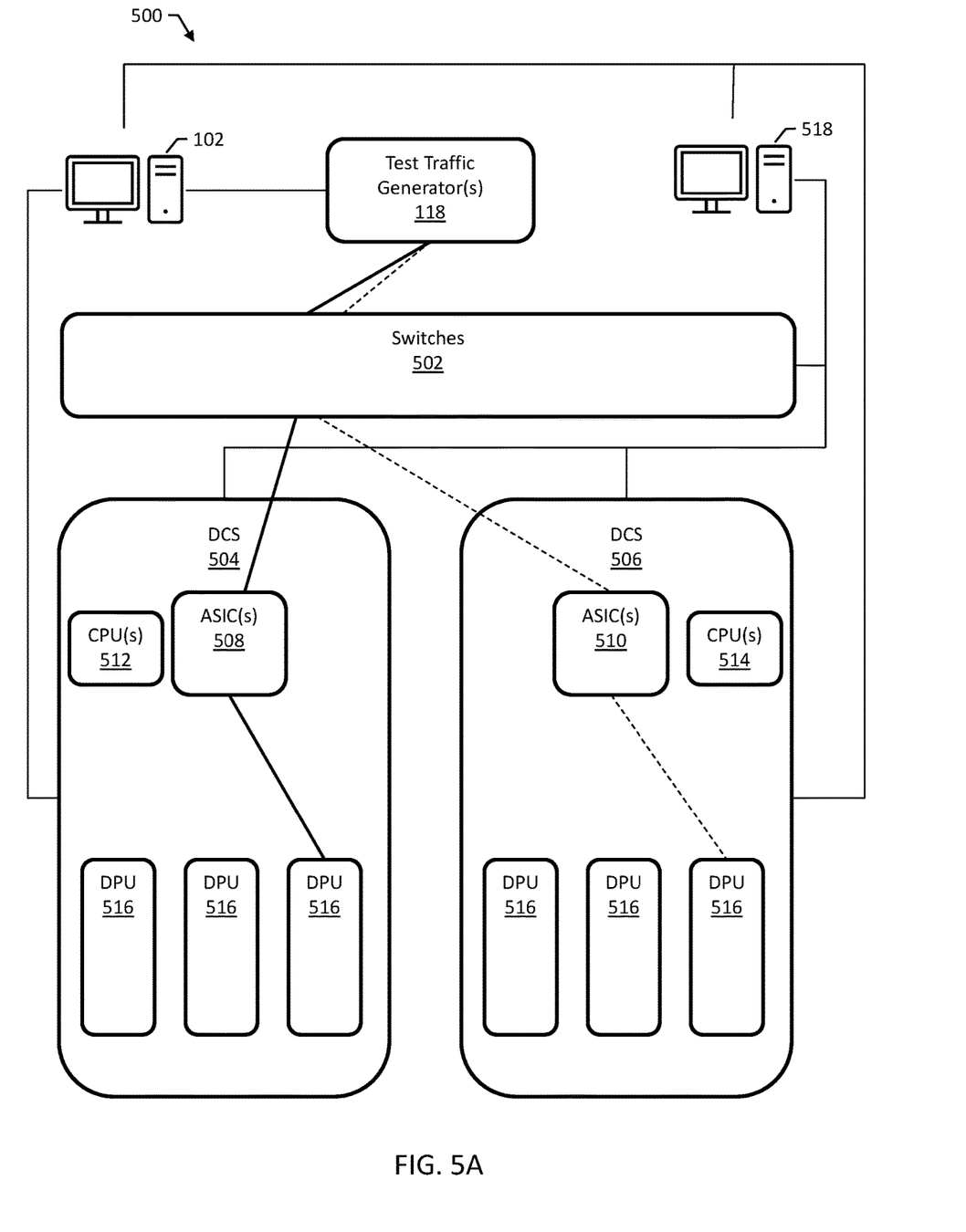
FIG. 5A is a block diagram of a system for testing HA performance with synthetic traffic flows by simulating an HA failover event.

FIG. 5A is a block diagram of a system 500 for testing HA performance with synthetic traffic flows by simulating an HA failover event, monitoring traffic loss and restoration and potentially other HA performance indicators, and maintaining a database of which DPU pairs are ready to handle production traffic HA switchover. In this example, the system 500 is testing a live data center with production traffic and performing measurements on the live data center while it continues normal operation. The synthetic traffic flows are communicated within the live data center in addition to the production traffic.

The system 500 includes a test controller 102, for example, the test controller 102 of FIG. 1 or any appropriate test system. The test controller 102, in this example, could be an application running on a computer system in the network or a software defined networking (SDN) controller application. Agents in other components could be participating in performing the functions of the test controller 102.

The system 500 includes a test traffic generator 118, e.g., the test traffic generator 118 of FIG. 1. The test traffic generator 118 can perform stateful and/or stateless traffic generation, and the test traffic generator 118 can be implemented in hardware or software or both (e.g., in virtual machines or containers). The test traffic generator 118 sends synthetic traffic targeting each DPU, e.g., routed via the switches 502 using hash-based load-balancing or another mechanism, to continuously verify HA readiness.

The system 500 includes live, operating data center components including a number of switches 502 and at least two data center switches 504 and 506 (for example, ToR switches or other appropriate switches). Each the data center switches 504 and 506 has at least one respective ASIC 508 and 510 and at least one respective CPU 512 and 514. Each of the data center switches 504 and 506 has a number of DPUs 516, which can each be part of a SmartSwitch. The ASICs 508 and 510 route packets from the switches 502 to the DPUs 516.

The system 500 includes a DASH SDN controller 518. The DASH SDN controller 518 can have logical connections to, e.g., the switches 502 and the data center switches 504 and 506. In some examples, the DASH SDN controller 518 can coordinate with the test controller 102, e.g., for resource reservation.

In operation, the system 500 executes a test case by performing one or more of the following functions:

Generate stateful and/or stateless test traffic, feed the test traffic into the data center from some appropriate feed (s); steer it to a DPU which has an HA peer. The traffic can be generated in any appropriate manner, e.g., the system 500 can use a central hardware traffic generator, a distributed fleet of VMs/containers, a software traffic generator in each switch itself sending synthetic traffic to each DPU, or the like. In some examples, the system uses VMs/containers running in the same VM servers as production traffic to also test the workings of those servers and other involved components.

The SDN controller 518 may participate and orchestrate (instruct the test controller 102, or control testing directly), or it can it reserve some capacity which the test controller 102 can utilize.

The system 500 may use agents/apps running in each switch CPU 512 and 514 and each DPU to participate in the testing.

The system 500 can generate a synthetic HA failover event (for targeted flows-only, so production traffic is not affected). This may use a variety of techniques including explicit route withdrawal, modified BGP daemons in DPUs to withdraw a route on demand, modifying IP addresses in traffic streams from active DPU's VIP to standby DPU's VIP, blackholing an IP address to simulate connection loss, etc.

The system 500 can perform testing (e.g., rotationally, continuously) throughout the data center to maintain an updated "HA readiness and performance score" for all switches/DPUs.

The system 500 can measure switchover performance metrics like time to restore active flows, amount of traffic disrupted, etc.

The system 500 can perform other HA test techniques and various other results can be collected as well, e.g., CPU KPIs, message capture via sniffers and relay to central collector via tunnels, measurements and/or estimation of flow-sync update rates and connection tracking between DPUs (in some cases, using telemetry from DPUs to a collector), etc.

Figure 5B:
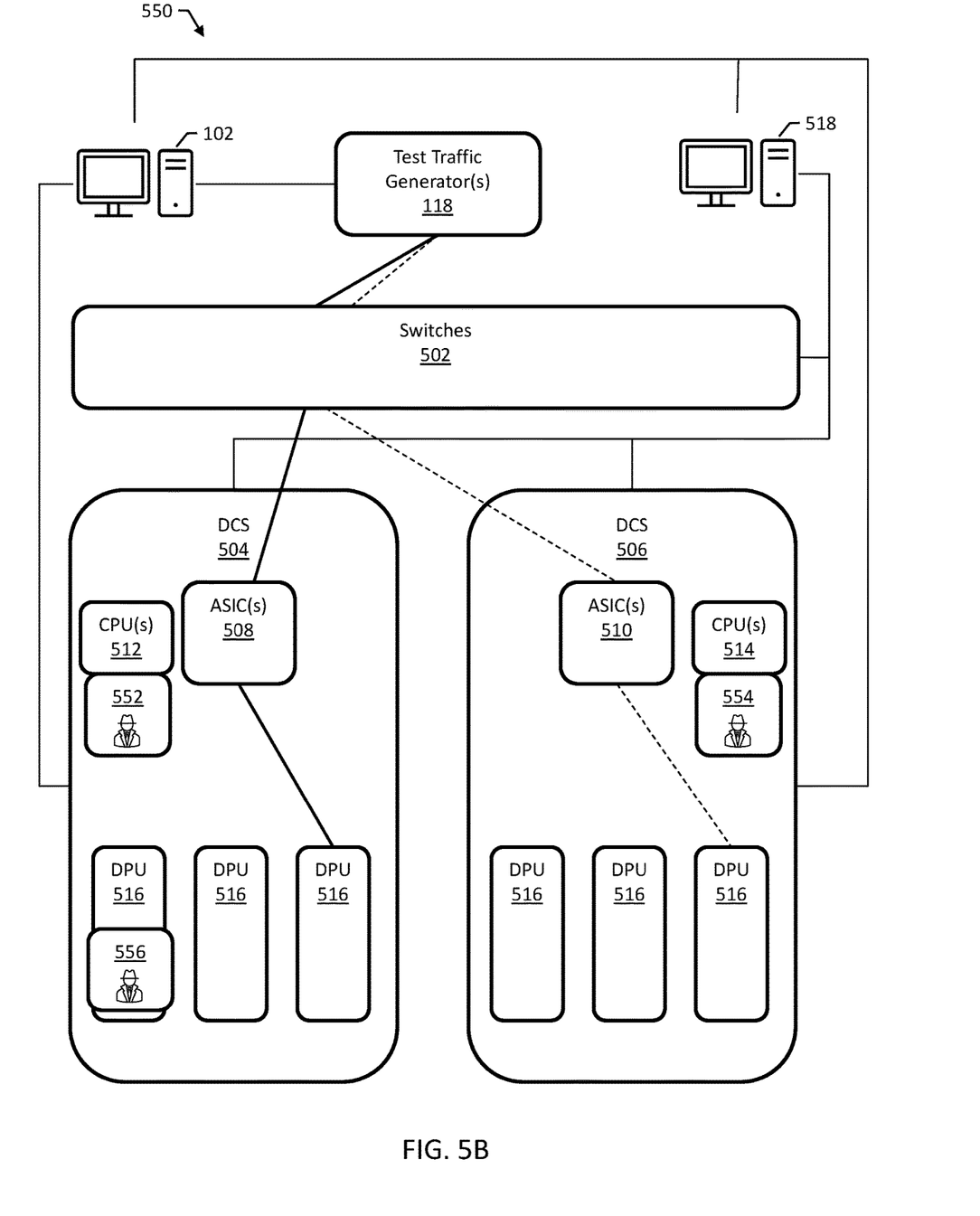
FIG. 5B is a block diagram of a system for testing HA performance with synthetic traffic flows that includes monitoring agents.

FIG. 5B is a block diagram of a system 550 for testing HA performance with synthetic traffic flows that includes monitoring agents 552, 554, and 556 that can be installed on the CPUs 512 and 514 and/or the DPU 516 software stacks. The monitoring agents 552, 554, and 556 can report measured data to the test controller 102 and/or the SDN controller 518.

The test controller 102 can induce a switchover event using any appropriate technique. For example, the test controller 102 can induce a switchover by causing an active route to be withdrawn in a ToR, causing the standby route to be taken. The test controller 102 can cause this by, e.g., sending a route withdrawal message. In some examples, the test controller 102 changes the VIP of the test traffic to suddenly start flowing to the standby DPU.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for testing a collection of distributed highly available (HA) data processing units (DPUs) in a data center, the system comprising:
    a test packet generator configured for generating test traffic and transmitting the test traffic towards an HA DPU pair;
    a test controller configured for executing, while the data center is operating with live traffic, a test case and controlling the test packet generator to cause a failover test event at the HA DPU pair by sending selected traffic to the HA DPU pair that causes an anomaly at the HA DPU pair and causes the HA DPU pair to detect the anomaly and initiate a switching event from a first HA DPU to a second HA DPU in response to detecting the anomaly; and
    a monitoring module, deployed on at least one DPU of the HA DPU pair, and configured for monitoring the HA DPU pair during the failover test event and reporting one or more metrics characterizing the failover test event to the test controller.

2. The system of claim 1, wherein controlling the test packet generator to cause the failover test event includes sending a control plane signaling message to a switch in the data center, causing a route to a first DPU of the HA DPU pair to be withdrawn.

3. The system of claim 1, wherein controlling the test packet generator to cause the failover test event includes controlling the test packet generator to change a destination address of the test traffic to cause the failover test event.

4. The system of claim 1, wherein the data center comprises a SmartSwitch, and wherein the SmartSwitch comprises the HA DPU pair.

5. The system of claim 1, wherein the data center comprises a DPU agent software module, deployed a DPU of the HA DPU pair, and configured for collecting and reporting the one or more metrics characterizing the failover test event.

6. The system of claim 1, wherein monitoring the HA DPU pair during the failover test event comprises monitoring and reporting HA synchronization signaling traffic communicated between the HA DPU pair.

7. A method for testing a collection of distributed highly available (HA) data processing units (DPUs) in a data center, the method comprising:
    generating test traffic and transmitting the test traffic towards an HA DPU pair;
    executing, while the data center is operating with live traffic, a test case;
    causing a failover test event at the HA DPU pair by sending selected traffic to the HA DPU pair that causes an anomaly at the HA DPU pair and causes the HA DPU pair to detect the anomaly and initiate a switching event from a first HA DPU to a second HA DPU in response to detecting the anomaly;
    monitoring, from at least one DPU of the HA DPU pair, the HA DPU pair during the failover test event; and
    reporting one or more metrics characterizing the failover test event.

8. The method of claim 7, wherein causing the failover test event includes sending a control plane signaling message to a switch in the data center, causing a route to a first DPU of the HA DPU pair to be withdrawn.

9. The method of claim 7, wherein causing the failover test event includes changing a destination address of the test traffic to cause the failover test event.

10. The method of claim 7, wherein the data center comprises a SmartSwitch, and wherein the SmartSwitch comprises the HA DPU pair.

11. The method of claim 7, wherein the data center comprises a DPU agent software module, deployed a DPU of the HA DPU pair, and configured for collecting and reporting the one or more metrics characterizing the failover test event.

12. The method of claim 7, wherein monitoring the HA DPU pair during the failover test event comprises monitoring and reporting HA synchronization signaling traffic communicated between the HA DPU pair.

* * * * *